United States Patent
Kumar et al.

(10) Patent No.: US 11,994,960 B2
(45) Date of Patent: May 28, 2024

(54) DATA RECOVERY IN VIRTUAL DESKTOP INFRASTRUCTURE ENVIRONMENTS

(71) Applicant: EMC IP Holding Company LLC, Hopkinton, MA (US)

(72) Inventors: Sunil Kumar, Bangalore (IN); Prashant Pokharna, Ajmer (IN); Shivasharan Dalasanur Narayana Gowda, Kolar (IN)

(73) Assignee: EMC IP Holding Company LLC, Hopkinton, MA (US)

(*) Notice: Subject to any disclaimer, the term of this patent is extended or adjusted under 35 U.S.C. 154(b) by 581 days.

(21) Appl. No.: 17/201,210

(22) Filed: Mar. 15, 2021

(65) Prior Publication Data
US 2022/0292002 A1    Sep. 15, 2022

(51) Int. Cl.
*G06F 11/14* (2006.01)
*G06F 9/451* (2018.01)
(Continued)

(52) U.S. Cl.
CPC .......... *G06F 11/1484* (2013.01); *G06F 9/452* (2018.02); *G06F 9/45558* (2013.01); *G06F 11/1471* (2013.01); *H04L 9/3213* (2013.01); *H04L 9/3247* (2013.01); *G06F 2009/45591* (2013.01); *G06F 2009/45595* (2013.01)

(58) Field of Classification Search
CPC .. G06F 11/1484; G06F 9/452; G06F 9/45558; G06F 11/1471; G06F 2009/45591; G06F 2009/45595; H04L 9/3213; H04L 9/3247
See application file for complete search history.

(56) References Cited

U.S. PATENT DOCUMENTS 8,719,522 B1 * 5/2014 Chait .................. G06F 11/1469
                                                            711/162
2011/0153838 A1 * 6/2011 Belkine .................. H04L 67/08
                                                            718/1
(Continued)

OTHER PUBLICATIONS

VMware Inc., "vSphere Storage," Update 1, VMware vSphere 7.0, VMware ESXi 7.0, vCenter Server 7.0, Jan. 4, 2021, 402 pages.
(Continued)

*Primary Examiner* — Wissam Rashid
(74) *Attorney, Agent, or Firm* — Ryan, Mason & Lewis, LLP

(57) ABSTRACT

An apparatus comprises a processing device configured to receive from a virtual desktop infrastructure client a request to recover data, to identify virtual desktops associated with the virtual desktop infrastructure client that are hosted on virtual machines running on virtualization infrastructure of a virtual desktop infrastructure environment, and to push a token to at least one of the virtual desktops. The processing device is further configured to authenticate the request to recover data based at least in part on validating a proof of knowledge of the token that is received from the virtual desktop infrastructure client, to receive from the virtual desktop infrastructure client a selection of at least a given one of a set of copies of the data of the virtual desktops, and to mount the given copy in at least one of the virtual desktops hosted on at least one of the virtual machines.

20 Claims, 12 Drawing Sheets

(51) Int. Cl.
  *G06F 9/455* (2018.01)
  *H04L 9/32* (2006.01)

(56) References Cited

U.S. PATENT DOCUMENTS

2018/0007099 A1* 1/2018 Ein-Gil ................ H04L 65/403
2020/0241905 A1* 7/2020 Soman ................ G06F 11/0793

OTHER PUBLICATIONS

VMware Inc., "What is VDI (Virtual Desktop Infrastructure)?" https://www.vmware.com/topics/glossary/content/virtual-desktop-infrastructure-vdi, Accessed Feb. 22, 2021, 5 pages.
VMware Inc., "VDI: A New Desktop Strategy. A Guide to Managing User Desktop Environments with Virtual Desktop Infrastructure," White Paper, 2006, 21 pages.
VMware Inc., "Introduction to Virtual Desktop Manager," 2008, 32 pages.
VMware Inc., "Installation and Administration Guide," VMware Virtual Desktop Manager 2.1, 2008, 88 pages.
VMware Inc., "vSphere Single Host Management," Update 1, VMware vSphere 5.5, VMware ESXI 5.5, 2017, 188 pages.

* cited by examiner

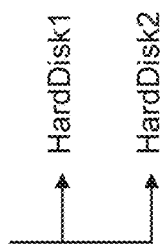
FIG. 6

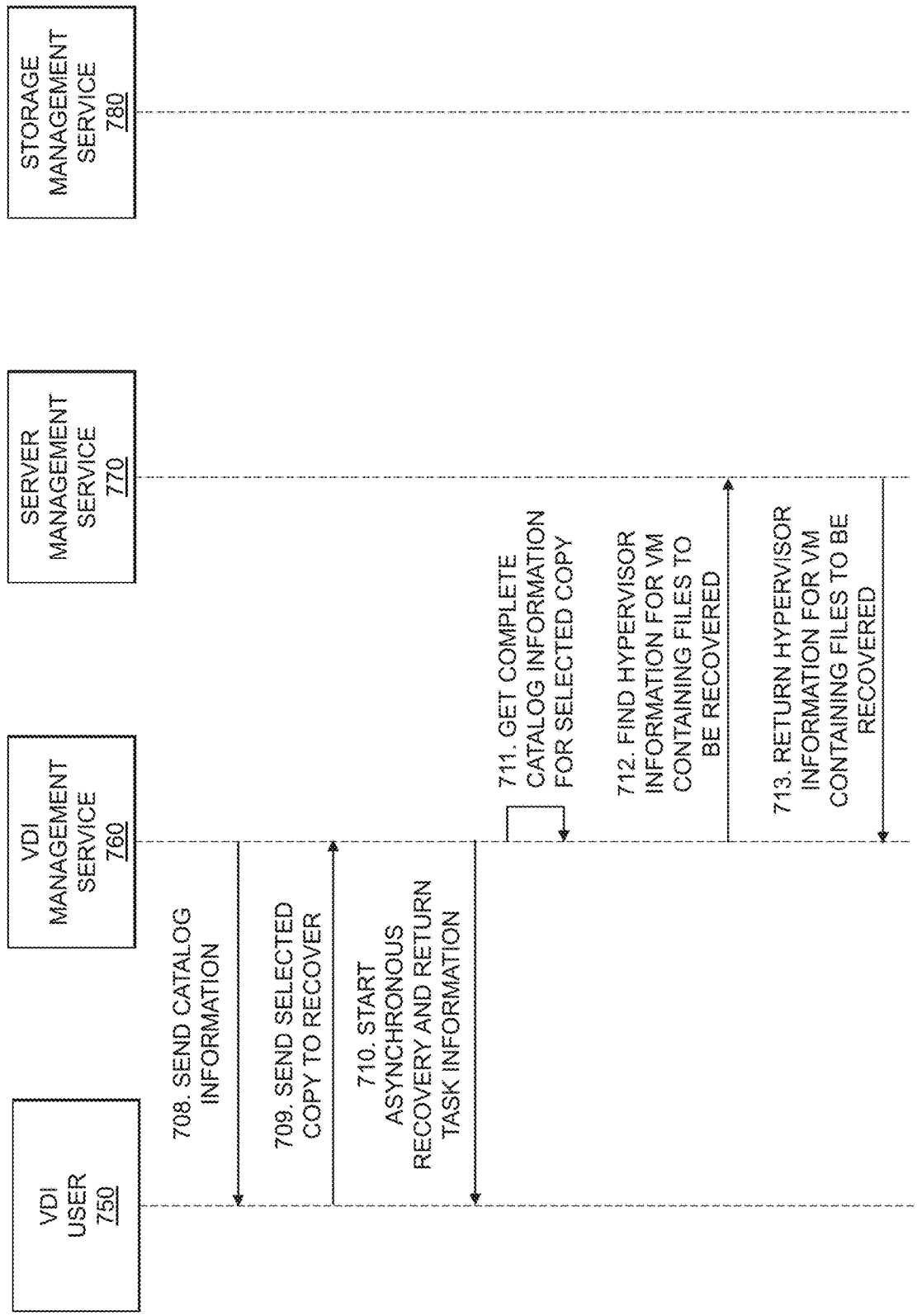

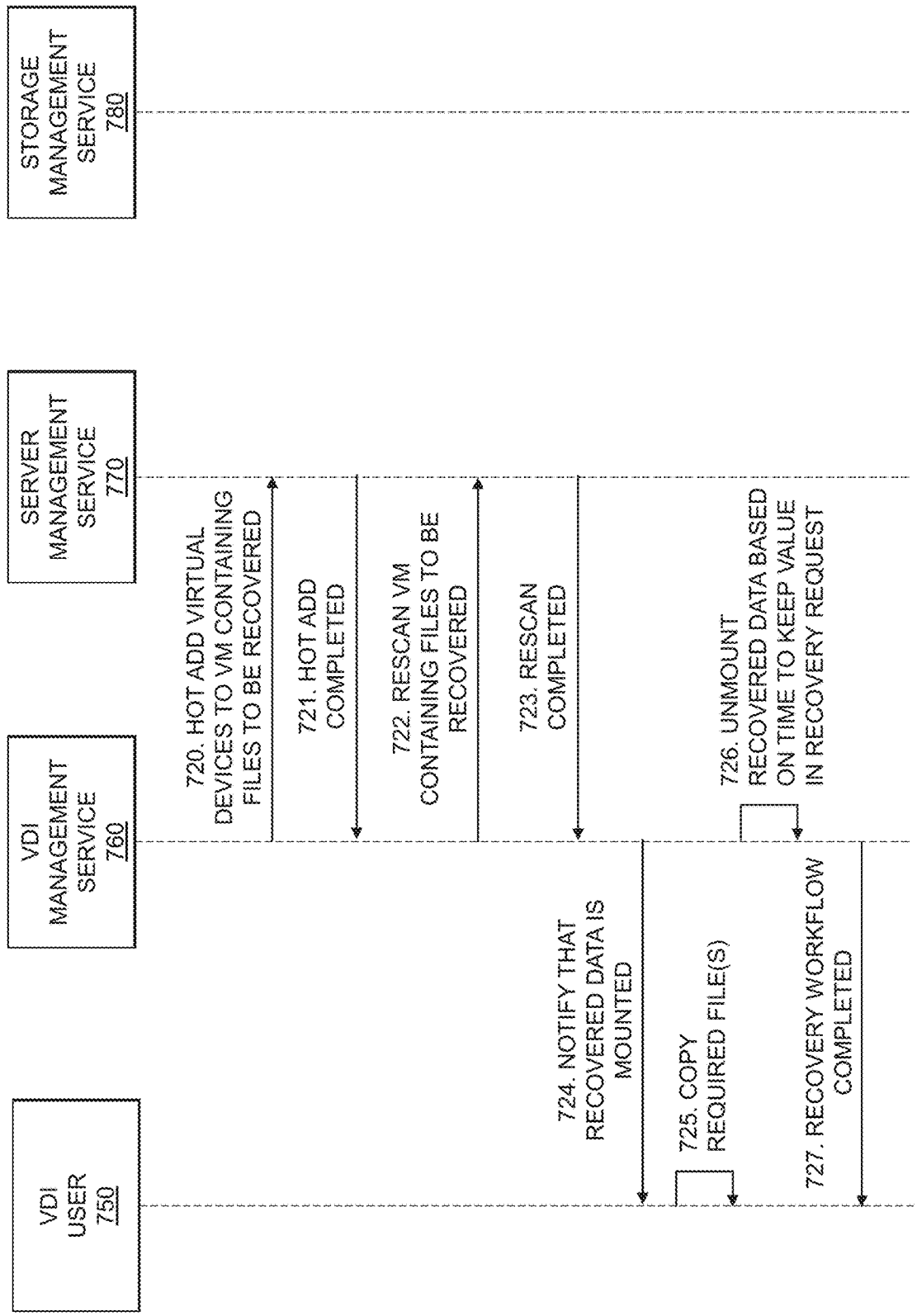

US 11,994,960 B2

DATA RECOVERY IN VIRTUAL DESKTOP INFRASTRUCTURE ENVIRONMENTS

FIELD

The field relates generally to information processing, and more particularly to techniques for managing information processing systems.

BACKGROUND

A virtual desktop infrastructure (VDI) environment may utilize virtual machines (VMs) for providing and managing virtual desktops of a set of end-users. The VDI environment may host the virtual desktop environments on a centralized server or servers, and deploys them on request to the end-users. The VDI environment may include virtualization infrastructure, such as a hypervisor, that segments physical infrastructure into VMs that host virtual desktops for the end-users. The end-users can access the virtual desktops as needed, from any device or location that is capable of communicating with the VDI environment.

SUMMARY

Illustrative embodiments of the present disclosure provide techniques for data recovery in virtual desktop infrastructure environments.

In one embodiment, an apparatus comprises at least one processing device comprising a processor coupled to a memory. The at least one processing device is configured to perform the steps of receiving, from a virtual desktop infrastructure client, a request to recover data and identifying one or more virtual desktops, associated with the virtual desktop infrastructure client, that are hosted on one or more virtual machines running on virtualization infrastructure of a virtual desktop infrastructure environment. The at least one processing device is also configured to perform steps of pushing a token to at least one of the one or more virtual desktops hosted on at least one of the one or more virtual machines, authenticating the request to recover data based at least in part on validating a proof of knowledge of the token, the proof of knowledge being received from the virtual desktop infrastructure client. The at least one processing device is further configured to perform steps of receiving, from the virtual desktop infrastructure client, a selection of at least a given one of a set of copies of the data of the one or more virtual desktops, and mounting the given copy in at least one of the one or more virtual desktops hosted on at least one of the one or more virtual machines.

These and other illustrative embodiments include, without limitation, methods, apparatus, networks, systems and processor-readable storage media.

BRIEF DESCRIPTION OF THE DRAWINGS

FIG. 6 illustrates catalog information returned by a virtual desktop infrastructure environment in response to a request for backup files in an illustrative embodiment.

FIGS. 7A-7D illustrate a process flow for a virtual desktop infrastructure environment to service requests for backup files in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
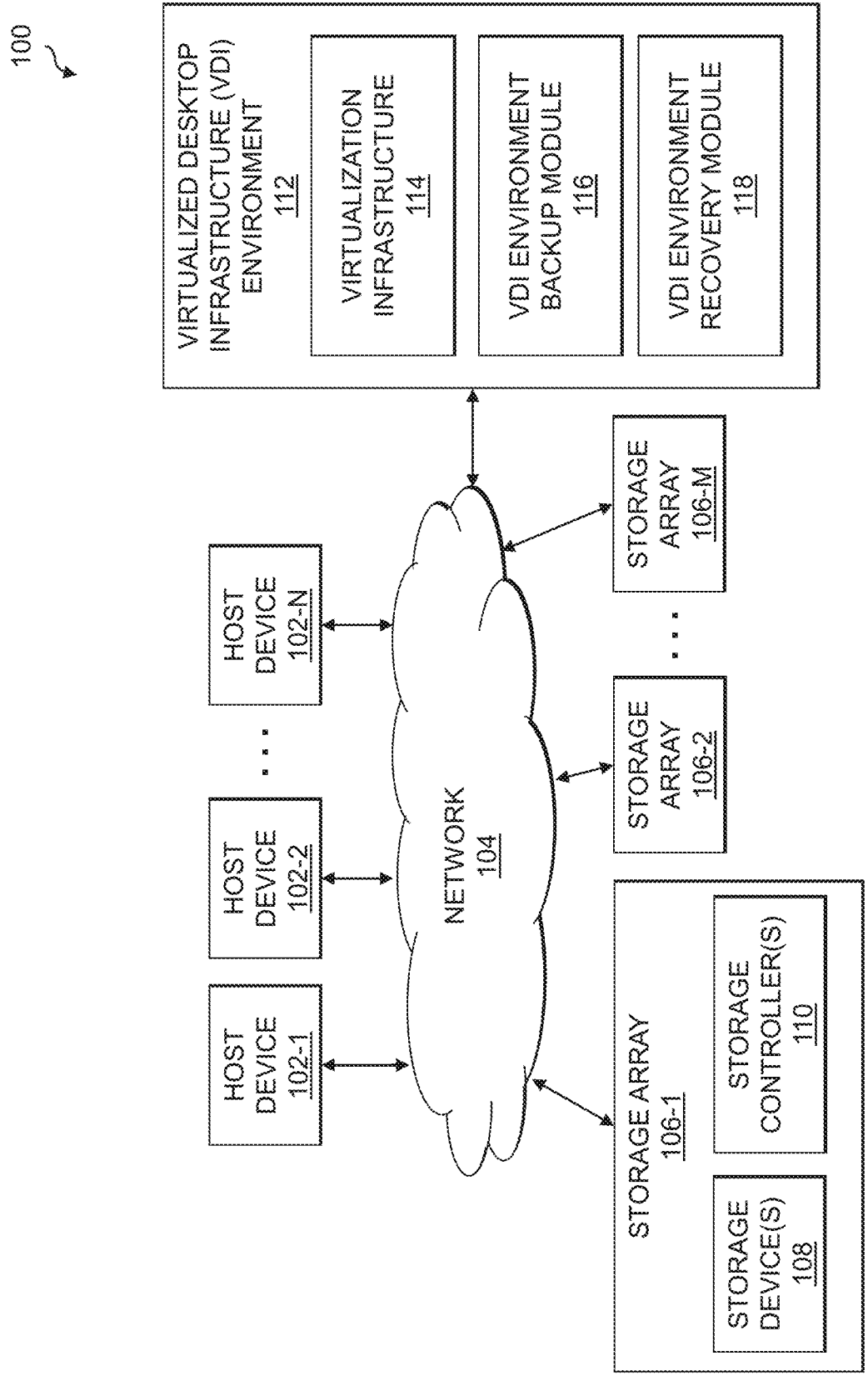
FIG. 1 is a block diagram of an information processing system configured for data recovery in a virtual desktop infrastructure environment in an illustrative embodiment.

FIG. 1 shows an information processing system 100 configured in accordance with an illustrative embodiment to provide functionality for data recovery in virtual desktop infrastructure environments. The information processing system 100 comprises one or more host devices 102-1, 102-2, . . . 102-N (collectively, host devices 102) that communicate over a network 104 with a virtual desktop infrastructure (VDI) environment 112. The VDI environment 112 includes virtualization infrastructure 114 for providing secure virtual desktop services to multiple users (e.g., of the host devices 102) in one or more enterprises. User data for virtual desktops provided using the virtualization infrastructure 114 may be stored on virtual disks in one or more datastores. Each of the datastores may host multiple virtual desktops (e.g., in the form of virtual machines (VMs)). One or more storage arrays 106-1, 106-2, . . . 106-M (collectively, storage arrays 106) are also coupled to the network 104, and provide the underlying physical storage used by the datastores in the VDI environment 112. The network 104 may comprise a storage area network (SAN).

The storage array 106-1, as shown in FIG. 1, comprises a plurality of storage devices 108 each storing data utilized by one or more of applications running on the host devices 102 (e.g., where such applications may include one or more applications running in virtual desktops or VMs in the VDI environment 112). The storage devices 108 are illustratively arranged in one or more storage pools. The storage array 106-1 also comprises one or more storage controllers 110 that facilitate IO processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 and virtualization infrastructure 114 of the VDI environment 112 illustratively comprise respective computers, servers or other types of processing devices capable of communicating with the storage arrays 106 via the network 104. For example, the virtualization infrastructure 114 of the VDI environment 112 may implement respective virtual machines of a compute services platform or other type of processing platform. Similarly, at least a subset of the host devices 102 may be implemented as respective virtual machines of a compute services platform or other type of processing platform. The host devices 102 and/or virtualization infrastructure 114 of the VDI environment 112 in such an arrangement illustratively provide compute services such as execution of one or more applications on behalf of each of one or more users (e.g., associated with respective ones of the host devices 102 and/or the VDI environment 112).

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102 (e.g., such as for virtual desktops or VMs in the VDI environment 112 utilized by the users of the host devices 102). These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The VDI environment 112, as noted above, includes virtualization infrastructure 114 for providing secure virtual desktop services to multiple users (e.g., of the host devices 102) in one or more enterprises. Examples of processing platforms that may be used to provide the virtualization infrastructure 114 will be described in further detail below in conjunction with FIGS. 8 and 9. The VDI environment 112 further includes a VDI environment backup module 116, which is configured to generate backups of datastores that store data of virtual desktops or VMs in the VDI environment 112. The VDI environment recovery module 118 is configured to provide secure, agentless and granular self-service recovery of user data from the datastore snapshots.

At least portions of the functionality of the VDI environment backup module 116 and the VDI environment recovery module 118 may be implemented at least in part in the form of software that is stored in memory and executed by a processor.

Although shown as external to the host devices 102 and storage arrays 106 in the FIG. 1 embodiment, it should be appreciated that the VDI environment 112 in other embodiments may be implemented at least in part internal to one or more of the host devices 102 and/or one or more of the storage arrays 106 (e.g., such as on the storage controllers 110 of storage array 106-1). For example, one or more of the host devices 102 and/or storage arrays 106 may provide at least a portion of the virtualization infrastructure 114 that supports virtual desktops, VMs and datastores storing user data for the virtual desktops and VMs.

The host devices 102, storage arrays 106 and the VDI environment 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102, the storage arrays 106 and the VDI environment 112 may be implemented on respective distinct processing platforms, although numerous other arrangements are possible. For example, in some embodiments at least portions of one or more of the host devices 102, the storage arrays 106 and the VDI environment 112 are implemented on the same processing platform. The VDI environment 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

The storage array 106-1 in the present embodiment is assumed to comprise a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the VDI environment 112, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the VDI environment 112 may be implemented at least in part in the first geographic location, the second geographic location, and one or more other geographic locations. Thus, it is possible in some implementations of the system 100 for different ones of the host devices 102, the storage arrays 106 and the VDI environment 112 to reside in different data centers.

Numerous other distributed implementations of the host devices 102, the storage arrays 106 and the VDI environment 112 are possible. Accordingly, the host devices 102, the storage arrays 106 and the VDI environment 112 can also be implemented in a distributed manner across multiple data centers.

Additional examples of processing platforms utilized to implement portions of the system 100 in illustrative embodiments will be described in more detail below in conjunction with FIGS. 8 and 9.

It is to be understood that the particular set of elements shown in FIG. 1 for data recovery in the VDI environment 112 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
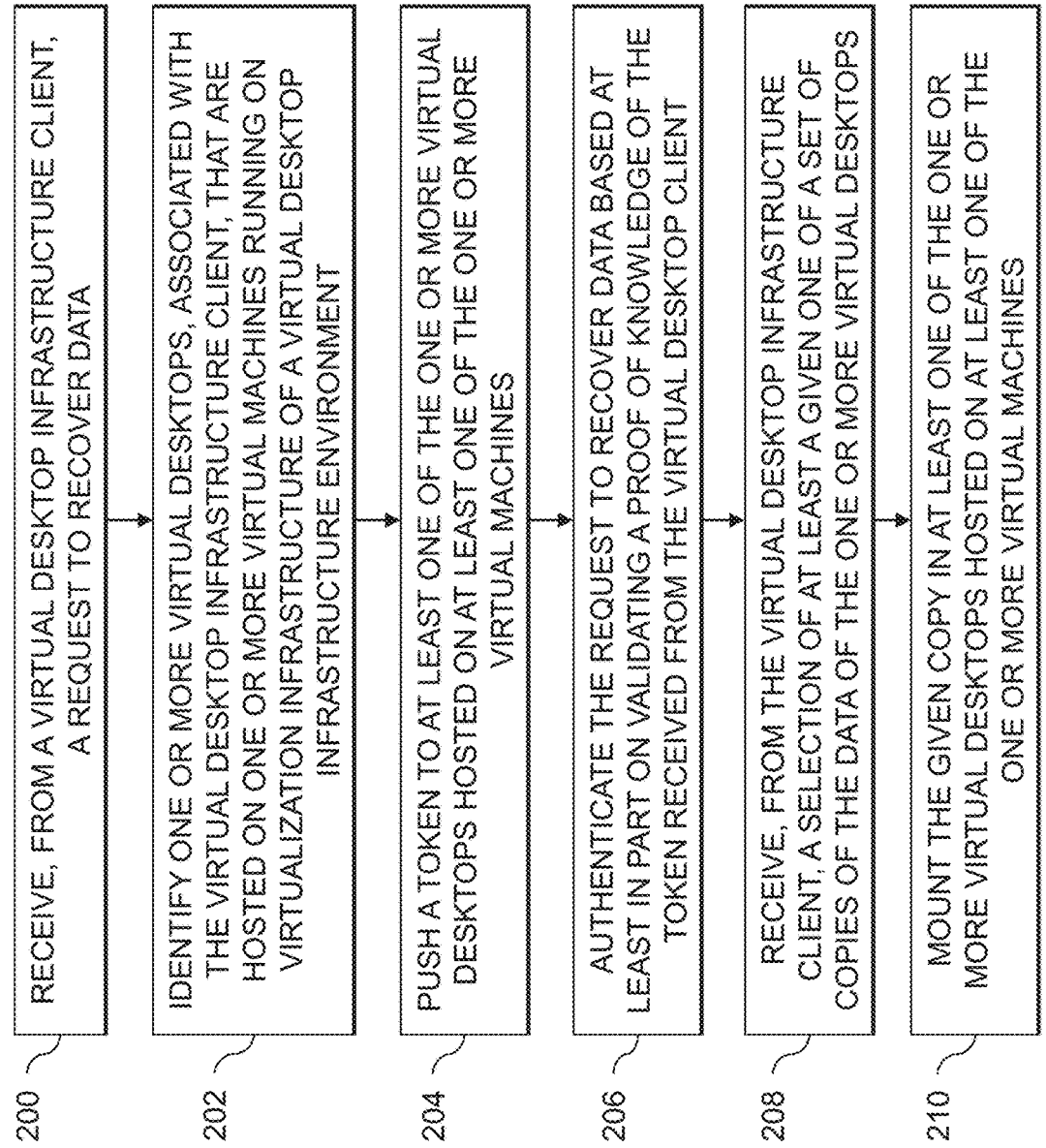
FIG. 2 is a flow diagram of an exemplary process for data recovery in a virtual desktop infrastructure environment in an illustrative embodiment.

An exemplary process for data recovery in virtual desktop infrastructure environments will now be described in more detail with reference to the flow diagram of FIG. 2. It is to be understood that this particular process is only an example, and that additional or alternative processes for data recovery in virtual desktop infrastructure environments may be used in other embodiments.

In this embodiment, the process includes steps 200 through 210. These steps are assumed to be performed by the VDI environment 112 utilizing the VDI environment backup module 116 and the VDI environment recovery module 118. The process begins with step 200, receiving, from a VDI client, a request to recover data. In step 202, one or more virtual desktops associated with the VDI client that are hosted on one or more VMs running on virtualization infrastructure of a VDI environment are identified. The VDI client may comprise a client device distinct from the one or more virtual desktops (e.g., the request received in step 200 may be received from any client device that is configured to communicate with the VDI environment). The step 200 request may specify a VDI identifier, and step 202 may comprise querying inventory information of the VDI environment utilizing the VDI identifier specified in the step 200 request.

In step 204, a token is pushed to at least one of the one or more virtual desktops hosted on at least one of the one or more virtual machines. Step 204 may include utilizing one or more application programming interfaces (APIs) exposed by the virtualization infrastructure on which the one or more virtual machines run to save the token to a predetermined storage location in a virtual disk of the at least one virtual desktop. The request to recover data is then authenticated in step 206, where the authentication is based at least in part on validating a proof of knowledge of the token, the proof of knowledge being received from the VDI client. For example, the VDI client may be required to upload a copy of the token, one or more keys or other information contained therein or derived therefrom, etc.

A selection of at least a given one of a set of copies of the data of the one or more virtual desktops is received from the VDI client in step 208. Step 208 may include determining the set of available copies of the data of the one or more virtual desktops and providing, to the VDI client, information specifying the set of available copies of the data of the one or more virtual desktops. Determining the set of available copies of the data of the one or more virtual desktops comprises querying a catalog of the VDI environment utilizing fully qualified domain names of the one or more virtual desktops. The step 200 request may specify a time range for recovery, and determining the set of available copies of the data of the one or more virtual desktops may comprise querying a catalog of the VDI environment for point-in-time copies of the data of the one or more virtual desktops failing within the specified time range for recovery. Providing the information specifying the set of available copies of the data of the one or more virtual desktops to the VDI client may comprise identifying virtual disk backups of the one or more virtual machines that are part of each of the set of available copies of the data of the one or more virtual desktops. Step 208 may include receiving a selection of a subset of virtual disks in the given copy of the data of the one or more virtual desktops comprising data to be recovered.

In step 210, the given copy is mounted in at least one of the one or more virtual desktops hosted on at least one of the one or more virtual machines. The step 200 request may specify a duration of time for making recovered data available, and the given copy may be unmounted from said at least one of the one or more virtual desktops hosted on said at least one of the one or more virtual machines responsive to expiration of the specified duration of time. Step 210 may comprise identifying at least one hypervisor host of the virtualization infrastructure on which said at least one of the one or more virtual machines run, masking the given copy to the identified at least one hypervisor host, performing a storage rescan of the identified at least one hypervisor host, and re-signaturing the given copy to the identified at least one hypervisor host. The given copy may be associated with a first signature, and re-signaturing the given copy to the identified at least one hypervisor host may comprise mounting, on one or more storage devices of one or more storage systems providing physical infrastructure hosting the virtualization infrastructure of the VDI environment, a datastore comprising the given copy with a second signature different than the first signature. Step 210 may further comprise hot adding one or more virtual disks of the given copy in said at least one of the one or more virtual desktops hosted on said at least one of the one or more virtual machines, and performing a storage rescan of the identified at least one hypervisor host.

In some information processing systems, VDI environments such as VDI environment 112 are used to provide secure virtual desktop services. For example, a VMware VDI environment may be used by several enterprises to provide secure virtual desktop services to multiple users in one or more enterprises. Virtual desktop user data that is created in virtual desktops or VMs may be finally stored in a virtual disk (e.g., a VMware virtual disk) on a datastore (e.g., a VMware Datastore, using VMware Virtual Machine File System (VMFS), Network File System (NFS), vSAN, etc.).

Consider a VDI deployment including a single datastore that hosts multiple virtual desktops (e.g., in the form of VMs). To protect user data stored inside a virtual desktop, an administrator (e.g., a VMware administrator) may make use of one or more backup or copy data management (CDM) tools to generate regular backup copes and/or snapshots of the datastore which internally backs up virtual desktop data. Various problems may arise when a virtual desktop user encounters any data corruption and needs access to backup data of that user's virtual desktop. Non-limiting examples of such problems will now be described. For example, backup and recovery solutions may be very lengthy and time-consuming processes, and involve several personas (e.g., a VMware administrator, a backup or storage administrator, an end user, etc.) to get back access to the backup data of any particular instant or version. If a virtual desktop user needs access to multiple backup copies (e.g., several past versions), this further increases the time and resources spent on getting access to the data. As another example, backup software may put agents on virtual desktops to assist in creating backup data (e.g., to read all the files and modifications) and giving access to the backed-up data. Such agents may orchestrate the recovery of data onto the virtual desktop. Agent installation and management, however, is very resource consuming particularly for large-scale VDI environments. As a further example, security needs to be taken care of by validating if a particular user who is asking for access to backed-up data is the genuine owner of the data or not, and if the host or desktop where the backed-up data will be made available is secure or not. As yet another example, granularity of recovery may present problems. When a particular user requests access to backed-up data, it must be determined how much of the backed-up data that user needs (e.g., a single file, a single folder, multiple files and/or folders, a whole filesystem, etc.). This may take multiple iterations to figure out what is needed.

Illustrative embodiments provide techniques which overcome these and other disadvantages and problems of conventional approaches through the use of a secure and agentless approach with enough granularity to meet the needs of end-users of secure virtual desktops. Advantageously, the secure and agentless approach provides the ability for a VDI user to perform recovery of data directly (e.g., without requiring involvement of a VMware administrator, storage administrator, or backup administrator). Thus, illustrative embodiments enable "self-service" recovery. In some embodiments, tools (e.g., VMware guest tools) are used to push a token to a VDI user's VM, which the VDI user is able to pick up and present for authentication. The secure and agentless approach may also be used to facilitate various other tasks in a VDI environment, including but not limited to: taking snapshots of the VDI at regular intervals; presenting a catalog to the VDI user; given selection of a copy, finding out what devices need to be recovered; mounting snapshots to the VDI; re-signaturing a datastore; etc.

In some embodiments, the secure and agentless approach includes or utilizes a backup or copy service and a virtual desktop authentication service. One or both of the backup/copy service and the virtual desktop authentication service may be implemented in accordance with a SaaS model. The backup/copy service is configured to back up the entire VDI environment and catalog the detailed inventory information specific to each of the virtual desktops which are backed up or copied (e.g., which virtual disks are attached to which virtual desktops, virtual desktop unique identifiers, virtual desktop host names or Fully Qualified Domain Names (FQDNs), etc.). The virtual desktop authentication service is configured to authenticate a virtual desktop when a recovery request is initiated for data specific to that virtual desktop.

A process for performing self-service recovery by a VDI user will now be described. To begin, the backup/copy service is configured to create a regular backup or copy of all the datastores on which the VDI environment is hosted. This ensures that backup copies for different points in time are available for recovery when needed. All the information related to a VM running a virtual desktop is stored in a persistent database that may be attached to the backup/copy service in the form of a catalog.

Figure 3:
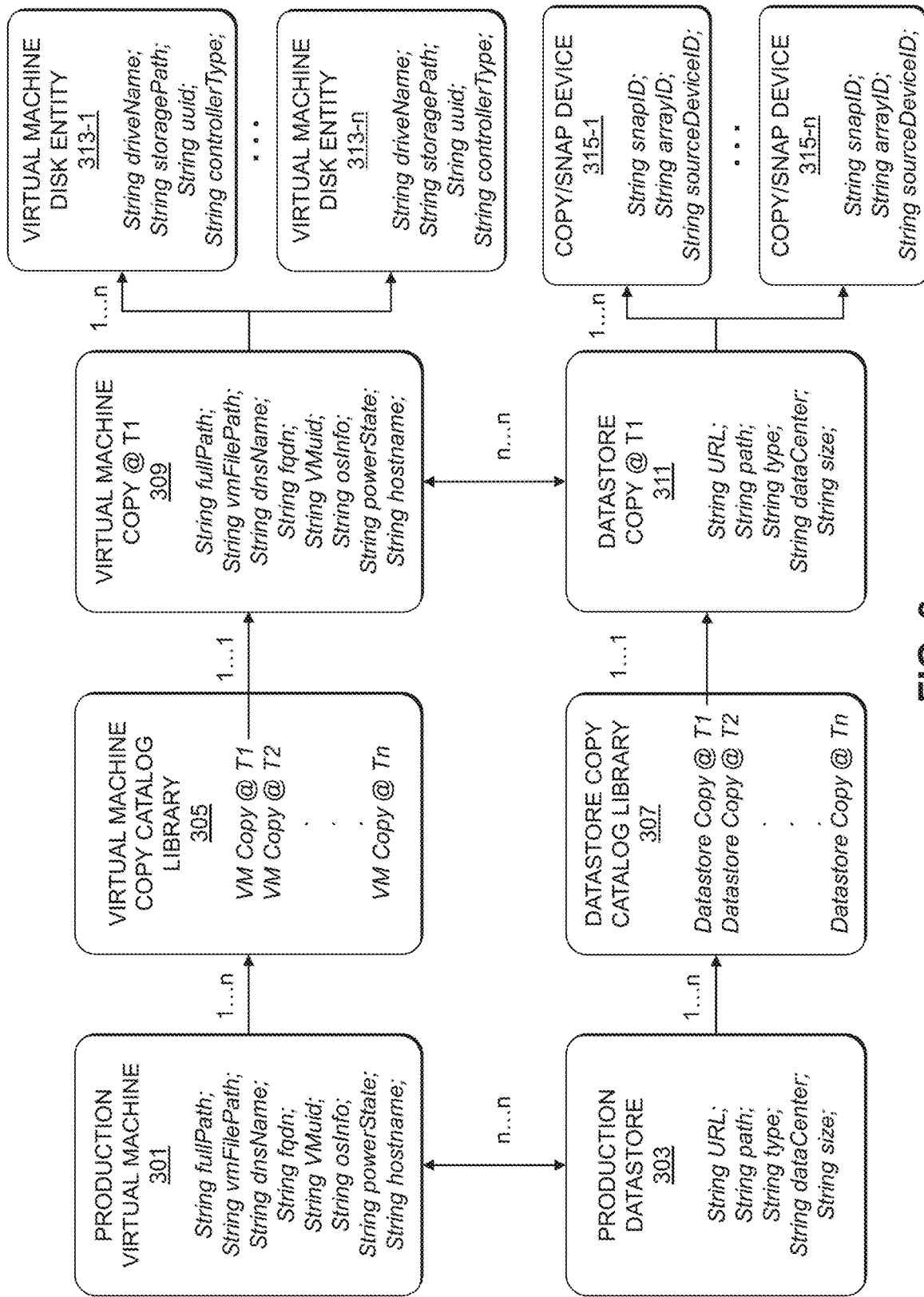
FIG. 3 illustrates catalog information for a virtual desktop infrastructure environment in an illustrative embodiment.

FIG. 3 illustrates catalog information stored for a production VM 301 and an associated production datastore 303. The production VM 301 may be associated with various information, such as strings for a full path, VM file path, Domain Name Service (DNS) name, FQDN, VM internal universally unique identifier (VMuid), operating system (OS) information, power state, hostname, etc. The production datastore 303 may be associated with various information, such as strings for a uniform resource locator (URL), path, type, data center and size. The production VM 301 is associated with a VM copy catalog library 305 storing a set of VM copies of the production VM 301 at times T1, T2, . . . Tn. Similarly, the production datastore 303 is associated with a datastore copy catalog library 307 storing a set of datastore copies of the production datastore 303 at times T1, T2, . . . Tn. FIG. 3 further illustrates particular instances of one of the VM copies and one of the datastore copies in the catalog libraries 305 and 307, respectively. Specifically, the VM copy at time T1 309 and the datastore copy at time T1 311 are shown. The copies 309 and 311 may store various information, such as strings similar to those described above with respect to the production VM 301 and the production datastore 303.

The VM copy 309 may be associated with a set of VM disk entities 313-1, . . . , 313-$n$ each indicating drive information for virtual disks utilized by the production VM 301 at the time the VM copy 309 was taken. In the FIG. 3 example, the VM disk entity information 313 includes strings for drive name, storage path, universally unique identifier (UUID) and controller type. The datastore copy 311 may be associated with a set of copy or snapshot devices 315-1, . . . 315-$n$ each indicating information for copy or snapshot devices utilized by the production datastore 301 for the datastore copy 311. In the FIG. 3 example, the copy or snapshot device information 315 includes strings for snapshot IDs, array IDs and source device IDs.

Within FIG. 3, it should be appreciated that the value "n" is used to refer to an arbitrary number and is not necessarily the same for every instance it is used. For example, the value of "n" referring to the total number of VM or datastore copies is not necessarily the same as the value of "n" referring to the total number VM disk entities or copy/snapshot devices.

As illustrated in FIG. 3, the catalog library may be indexed on various attributes (e.g., VM DNS name, FQDN, VM internal UUID, VM IP address, etc.). The index may be used to perform quick searches on the catalog library to query and gather information related to any virtual desktop in a VDI environment.

Figure 4:
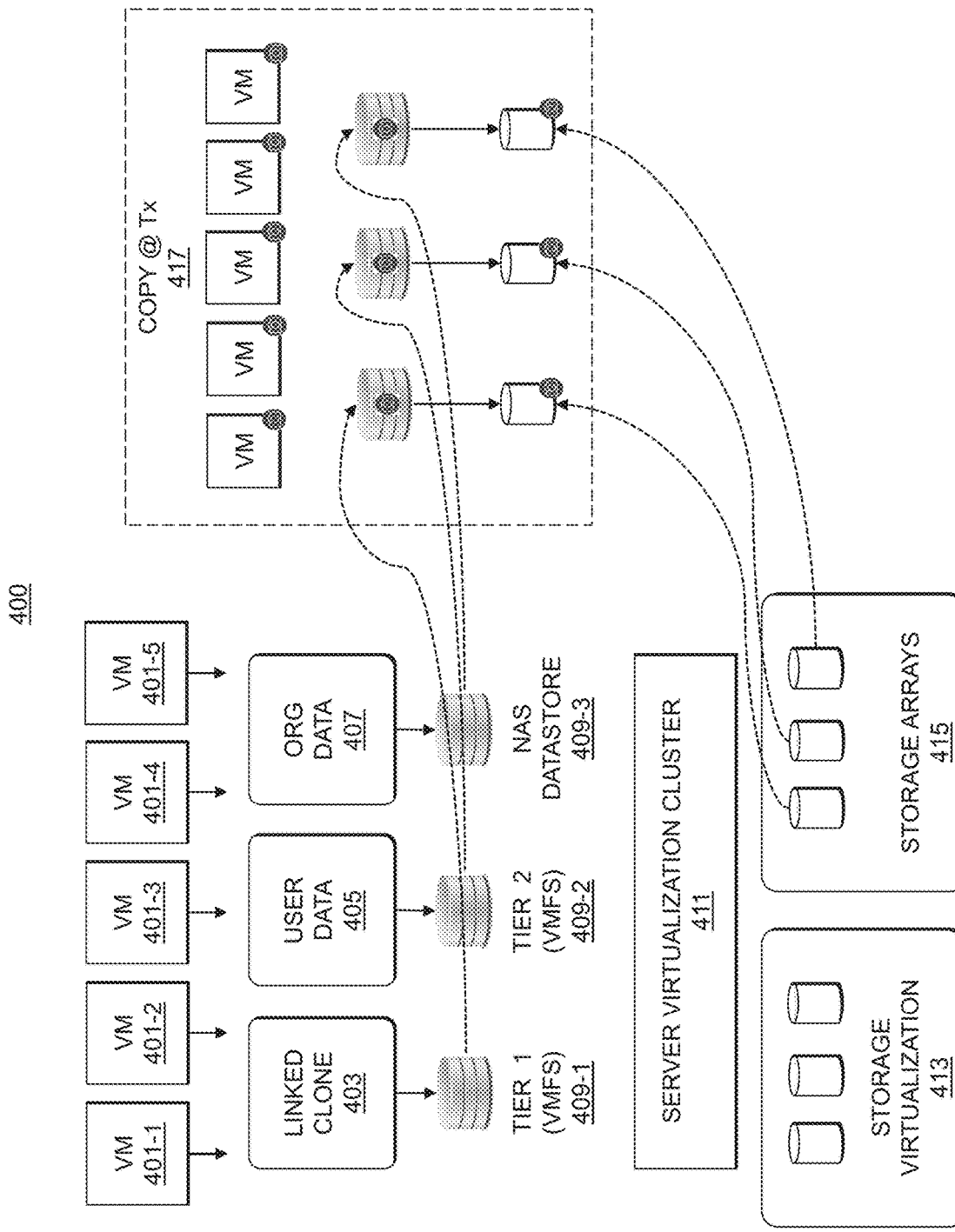
FIG. 4 illustrates a virtual desktop infrastructure environment configured to generate a backup copy in an illustrative embodiment.

FIG. 4 shows a VDI environment 400, which illustrates organization and generation of copies. In the VDI environment 400, there is a set of VMs 401-1 through 401-5 which store information for a linked clone 403, user data 405 and organization (ORG) data 407 in Tier 1 (VMFS) storage 409-1, Tier 2 (VMFS) storage 409-2 and an NAS datastore 409-3. The VDI environment 400 further includes a server virtualization cluster 411, which may run multiple instances of a server or other compute virtualization software (e.g., VMware vSphere), as well as storage virtualization 413 (e.g., VMware vSAN) and storage arrays 415. FIG. 4 illustrates how a particular copy at a time Tx 417 is generated for the VDI environment 400 using snapshots of the VMs 401-1 through 401-5, Tier 1 (VMFS) 409-1, Tier 2 (VMFS) 409-2 and NAS datastore 409-3, and storage arrays 415.

Figure 5:
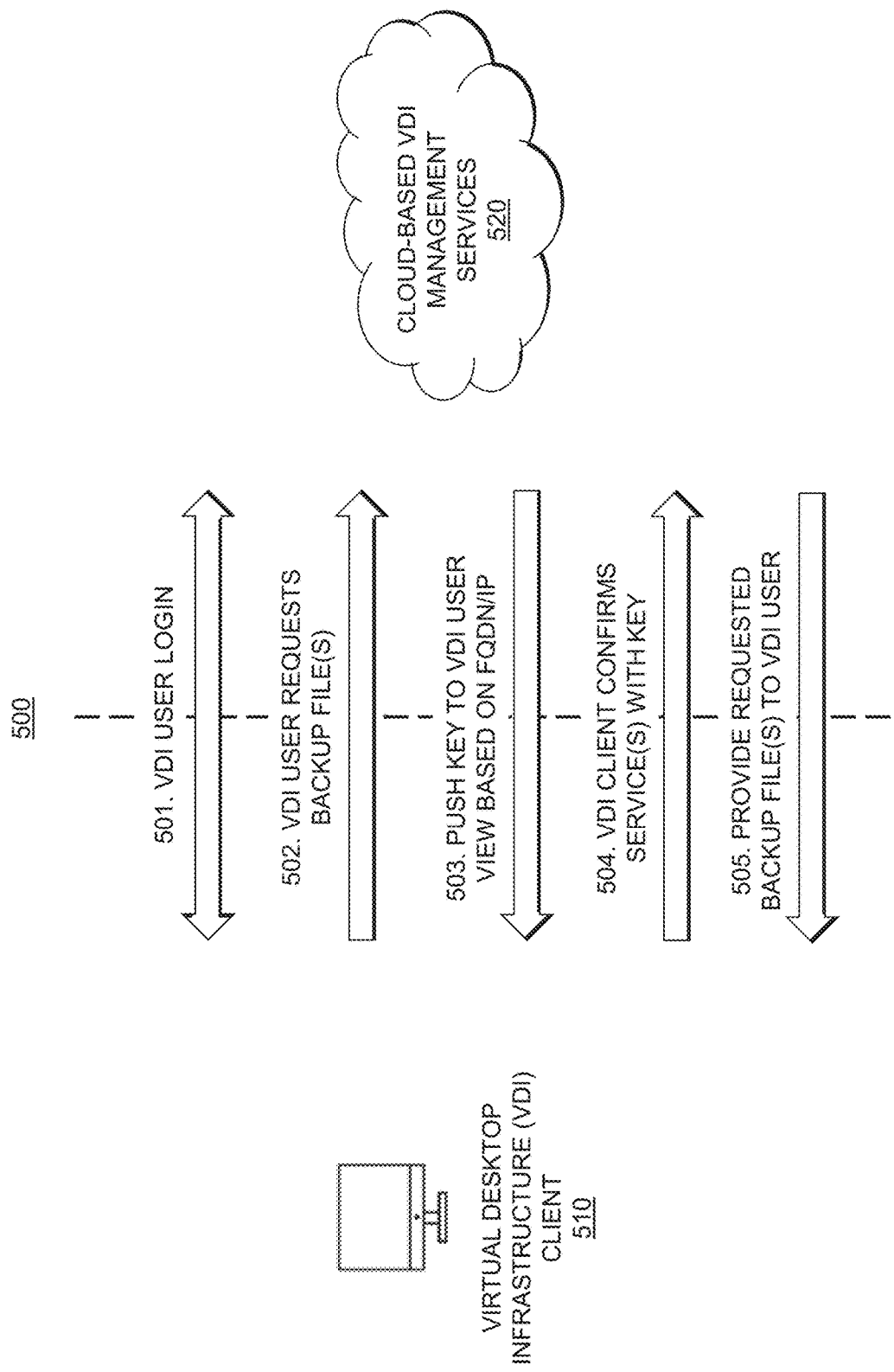
FIG. 5 illustrates a process flow for a virtual desktop infrastructure environment to service requests for backup files in an illustrative embodiment.

A VDI environment exposes one or more interfaces that virtual desktops can use to authenticate themselves. The authentication may be performed based on a virtual desktop's address information (e.g., FQDN address, IP address, combinations thereof, etc.) previously registered with the VDI environment (e.g., a VMware vCenter inventory). FIG. 5 illustrates a process 500 for authentication between a VDI client 510 and cloud-based VDI management services 520. In step 501, a VDI user uses the VDI client 510 to log in to the cloud-based VDI management services 520, such as utilizing a user name and password or other suitable credentials. Following successful login, the VDI user in step 502 requests backup files for a virtual desktop. The cloud-based VDI management services 520 then pushes a unique key, where the unique key may be based on a FQDN, IP address, or other information in step 503. The cloud-based VDI management service 520 may use a virtual machine API kit to copy and push a unique key to a predetermined location (e.g., CAtemp\key.txt) in the VDI client 510. The VDI user of the VDI client 510 then reads the unique key and uploads it back to the cloud-based VDI management services 520 in step 504 to complete the authentication process by confirming the cloud-based VDI management services 520.

Once the VDI client 510 is successfully authenticated with the cloud-based VDI management services 520, the requested backup files are provided to the VDI user in step 505. This may include the cloud-based VDI management services 520 performing a lookup in a catalog (e.g., such as that shown in FIG. 3). The lookup may be performed based on the FQDN or other address information for a given virtual desktop of the VDI user requesting backup files. For example, the cloud-based VDI management services 520 may retrieve all the copies existing in the catalog for the given virtual desktop. In some embodiments, the request in step 502 includes a time range, and the lookup in the catalog is limited to the time range specified in the step 502 request. The VDI user may be presented with a catalog of all the copies along with the data disks that are present in those copies. The copies may be listed and sorted by timestamp (e.g., point-in-time) when the backup, copy or snapshot was created. FIG. 6 shows an example of catalog information 600 that may be returned to a VDI user for VMs denoted VM1 and VM2. The VDI user can then select one or more disks from the catalog information 600 and initiate a recovery workflow. The recovery workflow may be provided with a "time to keep" value that indicates a duration for which the backup files or recovered data is to be made available to the virtual desktops of the virtual desktop user.

Figure 7A:
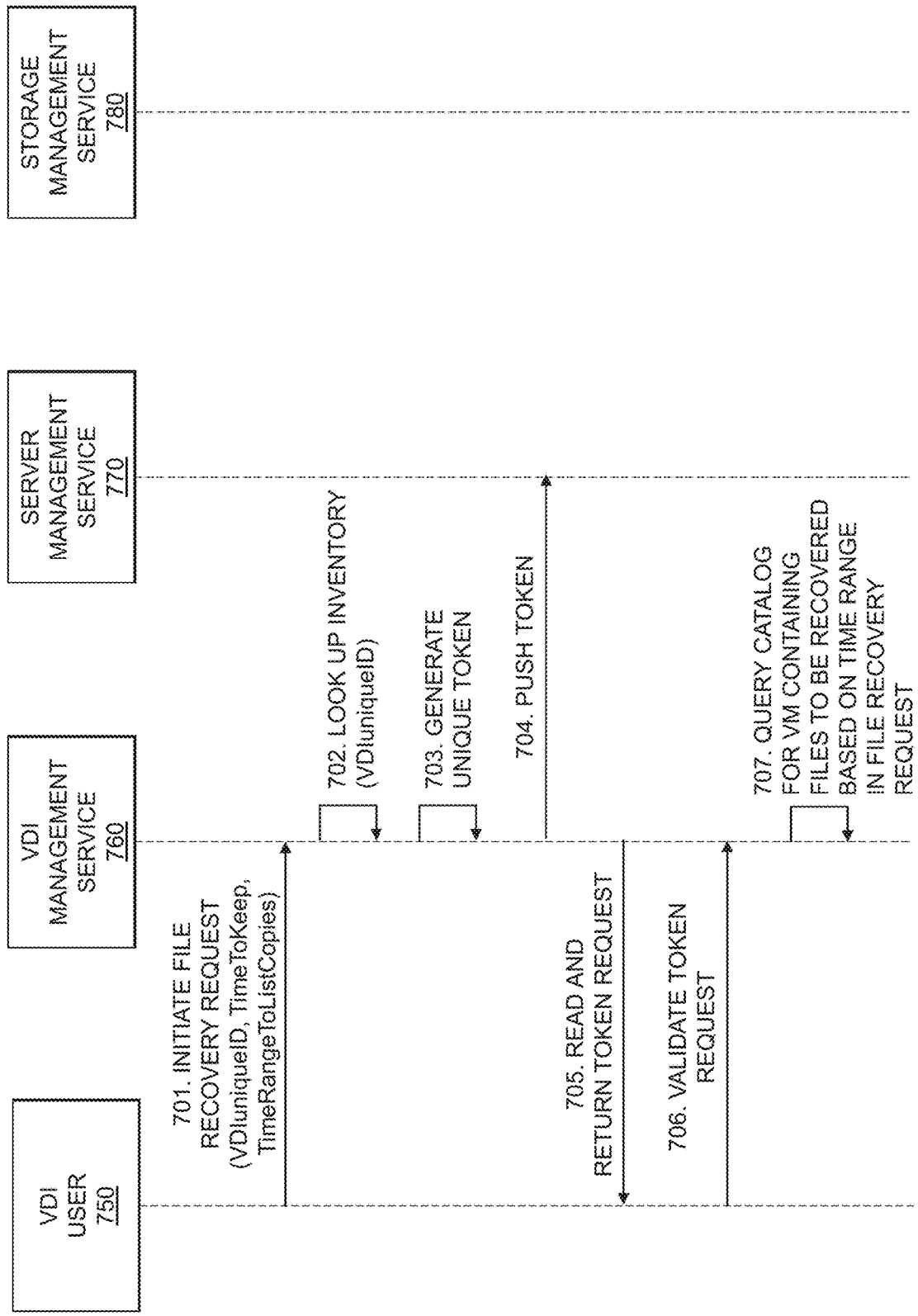

FIGS. 7A-7D illustrate a recovery workflow for a VDI user 750 to request and obtain access to backup files for virtual desktops associated with the VDI user 750. To do so, as illustrated in FIG. 7A, the VDI user 750 in step 701 initiates and sends a file recovery request to VDI management service 760. The file recovery request may specify various parameters, such as: a unique ID for the VDI user (e.g., VDIuniqueID); a time to keep value (e.g., TimeTo-Keep) specifying a duration that backup files or recovered data is to be made available to the virtual desktops of the VDI user 750; and a time range (e.g., TimeRangeToList-Copies) to use for performing a lookup in an inventory of VDI users. The VDI management service 760 in step 702 looks up inventory information for the VDI user 750 (e.g., utilizing the VDIuniqueID parameter in the step 701 recovery request). This may involve utilizing a catalog as described above.

In step 703, the VDI management service 760 generates a unique token or key for the VDI user 750. Step 703 may use any suitable token generation application programming interface (API). In some embodiments, the generated token comprises a JavaScript Object Notation (JSON) Web Token (JWT). In other embodiments the generated token may comprise a unique key, such as a unique UUID. In step 704, the generated token is pushed to a virtual desktop associated with the VDI user 750 using the server management service 770. The VDI management service 760 then sends a request to the VDI user 750 to read and return the generated token in step 705. The VDI user 750 reads the generated token from its associated virtual desktop. The generated token, as noted above, was previously pushed to the virtual desktop associated with the VDI user 750 by the server management service 770. The VDI user 750 then validates the step 705 token request with the VDI management service 760 in step 706. The VDI management service 760 then queries a catalog for VMs containing files to be recovered, based on the time range (e.g., the TimeRangeToListCopies parameter) specified in the step 701 recovery request in step 707.

As shown in FIG. 7B, the VDI management service 760 in step 708 sends the catalog information (e.g., a list of VM copies within the TimeRangeToListCopies) to the VDI user 750. In step 709, the VDI user 750 sends to the VDI management service 760 a selected copy (e.g., from among the VM copies listed in the returned catalog information) to recover. For example, the VDI user 750 may select a particular VM copy (e.g., a VM copy at time Tn as well as one or more available virtual disks that are in that VM copy). Consider the catalog information 600 in FIG. 6, where the VDI user 750 may by way of example select VM1 at time T1 and the HardDisk2 virtual disk for recovery.

In step 710, the VDI management service 760 starts an asynchronous recovery and returns task information to the VDI user 750. The VDI user 750 experience (e.g., a graphical user interface (GUI) provided to the VDI user 750) will wait for the asynchronous task to complete, and may show a "busy" status or other indicator. In step 711, the VDI management service 760 gets complete catalog information (e.g., complete information as to what datastores and snapshot or other copy devices need to be recovered) based on the VDI user 750 selection in step 709. In step 712, the VDI management service 760 queries the server management service 770 to find hypervisor information for the VM(s) containing files to be recovered. The server management service 770 in step 713 returns the hypervisor information for the VM(s) containing files to be recovered to the VDI management service 760.

Figure 7C:
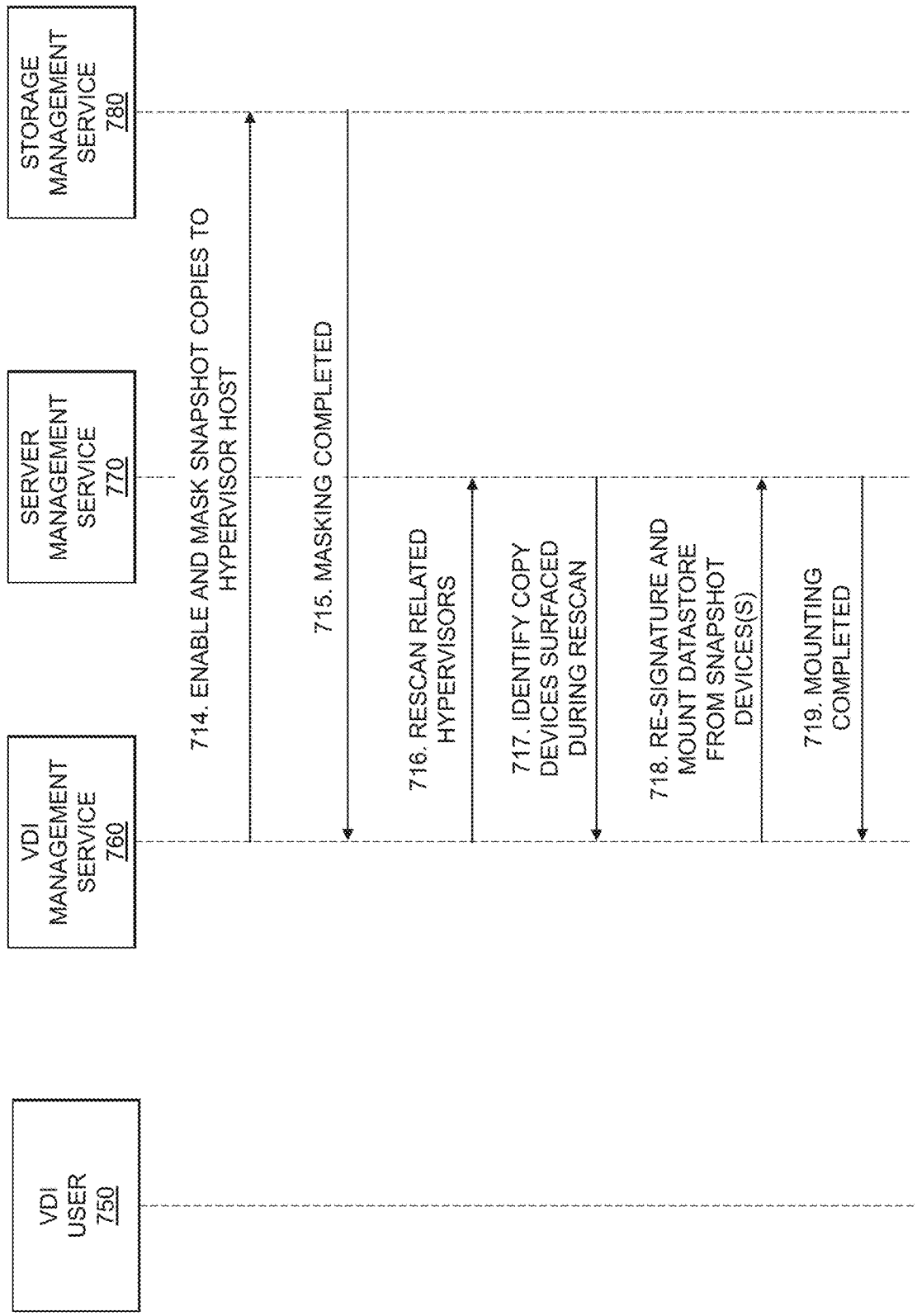

As shown in FIG. 7C, the VDI management service 760 will then communicate with the storage management service 780 to enable and mask snapshot copies to the hypervisor host(s) in step 714. The storage management service 780 indicates to the VDI management service 760 when masking is completed in step 715. In step 716, the VDI management service 760 rescans related hypervisors using the server management service 770. Step 716 may include initiating a rescan of the SCSI bus on all related hypervisors. The server management service 770 in step 717 returns to the VDI management services 750 copy or snapshot devices that are surfaced during the rescan operation. The VDI management service 760 will then communicate with the server management service 770 to initiate re-signature and mount of the datastore from such snapshot devices (e.g., identified during the step 716 rescan) in step 718. In step 719, the server management service 770 indicates to the VDI management service 760 when the mounting is completed.

As shown in FIG. 7D, in step 720 the VDI management service 760 communicates with the server management service 770 to hot add virtual devices to the VM(s) containing the files to be recovered. The server management service 770 in step 721 indicates to the VDI management service 760 when the hot add is completed. The VDI management service 760 in step 722 again rescans the VM(s) containing the files to be recovered (e.g., by rescanning the SCSI bus). The server management service 770 indicates to the VDI management service 760 in step 723 when the rescan is completed. The VDI management service 760 then notifies the VDI user 750 that the recovered data is mounted in step 724. In step 725, the VDI user 750 will copy required files (e.g., from the recovered data). The VDI management service 760 in step 726 unmounts the recovered data (e.g., based on the time to keep value in the recovery request of step 701). The recovery workflow is then completed in step 727.

It should be noted that the VDI user 750 in the recovery workflow shown in FIGS. 7A-7D represents the actual end-user or client who is interacting with the VDI management service 760 to recover the VDI data, and does not represent the user interacting as an "agent" as described elsewhere herein. For example, the VDI user 750 may connect to the VDI management service 760 from any location (e.g., from any suitable computing device) to initiate and drive the recovery workflow, so long as the VDI user 750 has access to the token. The VDI user 750 thus acts as a user of the service who submits requests, authenticates and then comes in when recovery of data completes to inspect and copy any files that the VDI user 750 is interested in. Unlike a backup workflow which may be completely automated, the recovery workflow is initiated by the VDI user 750 as needed to recover data files.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for data recovery in virtual desktop infrastructure environments will now be described in greater detail with reference to FIGS. 8 and 9. Although described in the context of system 100, these platforms may also be used to implement at least portions of other information processing systems in other embodiments.

Figure 8:
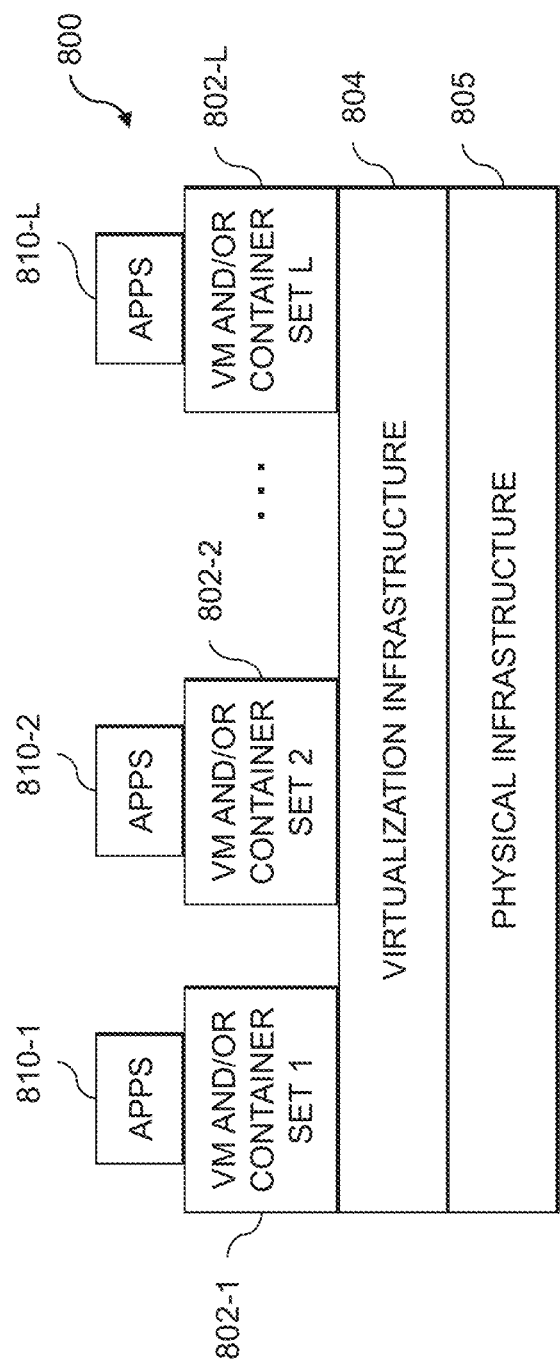
FIGS. 8 and 9 show examples of processing platforms that may be utilized to implement at least a portion of an information processing system in illustrative embodiments.
Figure 9:
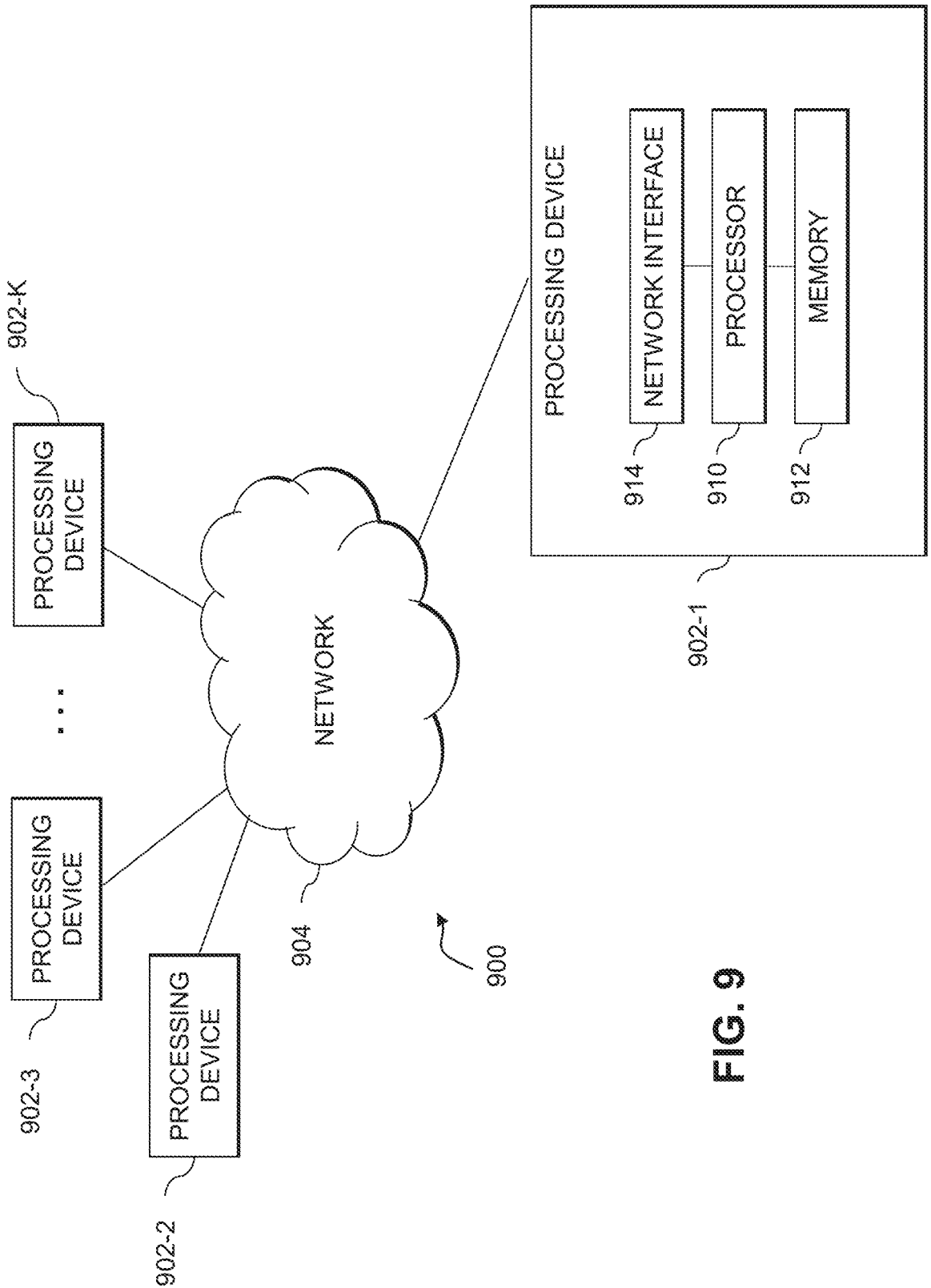

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for data recovery in virtual desktop infrastructure environments as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, virtual desktop infrastructures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      receiving, from a virtual desktop infrastructure client, a request to recover data;
      identifying one or more virtual desktops, associated with the virtual desktop infrastructure client, that are hosted on one or more virtual machines running on virtualization infrastructure of a virtual desktop infrastructure environment;
      pushing a token to at least one of the one or more virtual desktops hosted on at least one of the one or more virtual machines;
      authenticating the request to recover data based at least in part on validating a proof of knowledge of the token, the proof of knowledge being received from the virtual desktop infrastructure client;
      receiving, from the virtual desktop infrastructure client, a selection of at least a given one of a set of copies of the data of the one or more virtual desktops;
      mounting, for a given period of time, the given copy in at least one of the one or more virtual desktops hosted on at least one of the one or more virtual machines, the given period of time being based at least in part on information specified in the request to recover data received from the virtual desktop infrastructure environment; and
      unmounting the given copy from said at least one of the one or more virtual machines responsive to expiration of the given period of time.

2. The apparatus of claim 1 wherein the virtual desktop infrastructure client comprises a client device distinct from the one or more virtual desktops.

3. The apparatus of claim 1 wherein the request to recover data specifies a virtual desktop infrastructure identifier, and wherein identifying the one or more virtual desktops associated with the virtual desktop infrastructure client comprises querying inventory information of the virtual desktop infrastructure environment utilizing the virtual desktop infrastructure identifier specified in the request to recover data.

4. The apparatus of claim 1 wherein pushing the token to at least one of the one or more virtual desktops hosted on at least one of the one or more virtual machines comprises utilizing one or more application programming interfaces exposed by the virtualization infrastructure on which the one or more virtual machines run to save the token to a predetermined storage location in a virtual disk of the at least one virtual desktop.

5. The apparatus of claim 1 wherein the at least one processing device is further configured to perform the steps of:
   determining the set of available copies of the data of the one or more virtual desktops; and
   providing, to the virtual desktop infrastructure client, information specifying the set of available copies of the data of the one or more virtual desktops.

6. The apparatus of claim 5 wherein determining the set of available copies of the data of the one or more virtual desktops comprises querying a catalog of the virtual desktop infrastructure environment utilizing fully qualified domain names of the one or more virtual desktops.

7. The apparatus of claim 5 wherein the request to recover data specifies a time range for recovery, and wherein determining the set of available copies of the data of the one or more virtual desktops comprises querying a catalog of the virtual desktop infrastructure environment for point-in-time copies of the data of the one or more virtual desktops failing within the specified time range for recovery.

8. The apparatus of claim 5 wherein providing, to the virtual desktop infrastructure client, the information specifying the set of available copies of the data of the one or more virtual desktops comprises identifying virtual disk backups of the one or more virtual machines that are part of each of the set of available copies of the data of the one or more virtual desktops.

9. The apparatus of claim 1 wherein receiving, from the virtual desktop infrastructure client, the selection of the given copy of the data of the one or more virtual desktops comprises receiving a selection of a subset of virtual disks in the given copy of the data of the one or more virtual desktops comprising data to be recovered.

10. The apparatus of claim 1 wherein the information specified in the request to recover data comprises a requested amount of time for making recovered data available.

11. An apparatus comprising:
at least one processing device comprising a processor coupled to a memory;
the at least one processing device being configured to perform steps of:
receiving, from a virtual desktop infrastructure client, a request to recover data;
identifying one or more virtual desktops, associated with the virtual desktop infrastructure client, that are hosted on one or more virtual machines running on virtualization infrastructure of a virtual desktop infrastructure environment;
pushing a token to at least one of the one or more virtual desktops hosted on at least one of the one or more virtual machines;
authenticating the request to recover data based at least in part on validating a proof of knowledge of the token, the proof of knowledge being received from the virtual desktop infrastructure client;
receiving, from the virtual desktop infrastructure client, a selection of at least a given one of a set of copies of the data of the one or more virtual desktops; and
mounting the given copy in at least one of the one or more virtual desktops hosted on at least one of the one or more virtual machines;
wherein mounting the given copy in said at least one of the one or more virtual desktops hosted on said at least one of the one or more virtual machines comprises:
identifying at least one hypervisor host of the virtualization infrastructure on which said at least one of the one or more virtual machines run; and
masking the given copy to the identified at least one hypervisor host.

12. The apparatus of claim 11 wherein mounting the given copy in said at least one of the one or more virtual desktops hosted on said at least one of the one or more virtual machines further comprises:
performing a storage rescan of the identified at least one hypervisor host; and
re-signaturing the given copy to the identified at least one hypervisor host.

13. The apparatus of claim 12 wherein the given copy is associated with a first signature, and wherein re-signaturing the given copy to the identified at least one hypervisor host comprises mounting, on one or more storage devices of one or more storage systems providing physical infrastructure hosting the virtualization infrastructure of the virtual desktop infrastructure environment, a datastore comprising the given copy with a second signature different than the first signature.

14. The apparatus of claim 12 wherein mounting the given copy in said at least one of the one or more virtual desktops hosted on said at least one of the one or more virtual machines further comprises:
hot adding one or more virtual disks of the given copy in said at least one of the one or more virtual desktops hosted on said at least one of the one or more virtual machines; and
performing a storage rescan of the identified at least one hypervisor host.

15. A computer program product comprising a non-transitory processor-readable storage medium having stored therein program code of one or more software programs, wherein the program code when executed by at least one processing device causes the at least one processing device to perform steps of:
receiving, from a virtual desktop infrastructure client, a request to recover data;
identifying one or more virtual desktops, associated with the virtual desktop infrastructure client, that are hosted on one or more virtual machines running on virtualization infrastructure of a virtual desktop infrastructure environment;
pushing a token to at least one of the one or more virtual desktops hosted on at least one of the one or more virtual machines;
authenticating the request to recover data based at least in part on validating a proof of knowledge of the token, the proof of knowledge being received from the virtual desktop infrastructure client;
receiving, from the virtual desktop infrastructure client, a selection of at least a given one of a set of copies of the data of the one or more virtual desktops;
mounting, for a given period of time, the given copy in at least one of the one or more virtual desktops hosted on at least one of the one or more virtual machines, the given period of time being based at least in part on information specified in the request to recover data received from the virtual desktop infrastructure environment; and
unmounting the given copy from said at least one of the one or more virtual machines responsive to expiration of the given period of time.

16. The computer program product of claim 15 wherein pushing the token to at least one of the one or more virtual desktops hosted on at least one of the one or more virtual machines comprises utilizing one or more application programming interfaces exposed by the virtualization infrastructure on which the one or more virtual machines run to save the token to a predetermined storage location in a virtual disk of the at least one virtual desktop.

17. The computer program product of claim 15 wherein the information specified in the request to recover data comprises a requested amount of time for making recovered data available.

18. A method comprising:
receiving, from a virtual desktop infrastructure client, a request to recover data;
identifying one or more virtual desktops, associated with the virtual desktop infrastructure client, that are hosted on one or more virtual machines running on virtualization infrastructure of a virtual desktop infrastructure environment;
pushing a token to at least one of the one or more virtual desktops hosted on at least one of the one or more virtual machines;
authenticating the request to recover data based at least in part on validating a proof of knowledge of the token, the proof of knowledge being received from the virtual desktop infrastructure client;

receiving, from the virtual desktop infrastructure client, a selection of at least a given one of a set of copies of the data of the one or more virtual desktops;

mounting, for a given period of time, the given copy in at least one of the one or more virtual desktops hosted on at least one of the one or more virtual machines, the given period of time being based at least in part on information specified in the request to recover data received from the virtual desktop infrastructure environment; and unmounting the given copy from said at least one of the one or more virtual machines responsive to expiration of the given period of time;

wherein the method is performed by at least one processing device comprising a processor coupled to a memory.

19. The method of claim 18 wherein pushing the token to at least one of the one or more virtual desktops hosted on at least one of the one or more virtual machines comprises utilizing one or more application programming interfaces exposed by the virtualization infrastructure on which the one or more virtual machines run to save the token to a predetermined storage location in a virtual disk of the at least one virtual desktop.

20. The method of claim 18 wherein the information specified in the request to recover data comprises a requested amount of time for making recovered data available.

* * * * *